United States Patent [19]

Patterson et al.

[11] 4,077,843

[45] Mar. 7, 1978

[54] NUCLEAR REACTOR SPRING STRIP GRID SPACER

[75] Inventors: John F. Patterson; Barney S. Flora, both of Richland, Wash.

[73] Assignee: Exxon Nuclear Company, Inc., Bellevue, Wash.

[21] Appl. No.: 688,924

[22] Filed: May 21, 1976

[51] Int. Cl.² .............................................. G21C 3/30
[52] U.S. Cl. ........................................ 176/76; 176/78
[58] Field of Search .................................. 176/76, 78

[56] References Cited

U.S. PATENT DOCUMENTS

| | | | |
|---|---|---|---|
| 3,350,275 | 10/1967 | Venier et al. | 176/78 |
| 3,804,354 | 4/1974 | Weiss | 176/76 X |
| 3,852,154 | 12/1974 | Carlson et al. | 176/78 |
| 3,920,515 | 11/1975 | Ferrari et al. | 176/78 |
| 3,929,569 | 12/1975 | Piepers et al. | 176/78 |

Primary Examiner—Peter A. Nelson
Attorney, Agent, or Firm—F. Donald Paris

[57] ABSTRACT

A bimetallic grid spacer comprising a grid structure of zircaloy formed by intersecting striplike members which define fuel element openings for receiving fuel elements and spring strips made of Inconel positioned within the grid structure for cooperating with the fuel elements to maintain them in their desired position. A plurality of these spring strips extend longitudinally between sides of the grid structure, being locked in position by the grid retaining strips. The fuel rods, which are disposed in the fuel openings formed in the grid structure, are positioned by means of the springs associated with the spring strips and a plurality of dimples which extend from the zircaloy grid structure into the openings. In one embodiment the strips are disposed in a plurality of arrays with those spring strip arrays situated in opposing diagonal quadrants of the grid structure extending in the same direction and adjacent spring strip arrays in each half of the spacer extending in relatively perpendicular directions. Other variations of the spring strip arrangements for a particular fuel design are disclosed herein.

10 Claims, 10 Drawing Figures

NUCLEAR REACTOR SPRING STRIP GRID SPACER

BACKGROUND OF THE INVENTION

Nuclear reactor fuel element assemblies employ grid spacers for maintaining the fuel elements in parallel array. Typically each fuel element assembly in the reactor will employ one or more grid spacers disposed in spaced relation along the length of the assembly, serving to maintain the fuel elements in their correct lateral disposition relative to each other. Grid spacer designs heretofore have essentially comprised a plurality of intersecting members secured together and having a peripheral band for creating a structural member which can accommodate the fuel elements. These structures include springs of the lantern-type design at various of the intersections of the members, which extend into the adjoining fuel openings for coaction with the grid structure to maintain the fuel elements in their desired orientation, especially when the reactor is in operation. The number of springs typically required are usually quite large depending upon the particular fuel design and the overall assembly and construction of such a prior art grid spacer has been relatively complex and expensive from a fabrication viewpoint. Usually, these lantern-type springs have been supported by the grid structure in order to permit them to provide their desired function. Prior art grid spacers of this type may be found in U.S. Pat. Nos. 3,379,618 and 3,654,077.

Another prior art grid structure which includes resilient supports for the fuel elements is disclosed in U.S. Pat. No. 3,833,471. This latter patent, while disclosing the use of spring strip, essentially differs from the present invention in a number of significant respects as will become apparent from detailed reading of this disclosure. The present invention offers advantages over the latter patent which include not only those mentioned heretofore, but also provide for more positive alignment of the strip while allowing greater flexibility to counterbalance the effects of differential thermal expansion. The springs are arranged in alternating directions so that the reaction forces tend to counterbalance each other which in turn minimize the reaction loads on the supporting structure.

SUMMARY OF THE INVENTION

This invention relates to nuclear reactors and more particularly to an improved and novel grid spacer for use in nuclear reactor fuel assemblies. In accordance with the present invention there is provided a grid spacer preferably of the bimetallic type, wherein the grid comprises an array of spring strips which are positioned by structural members of zircaloy or other materials with relatively low neutron absorption characteristics in contrast to welding the spring strips in place or fabricating the spring as an integral part of the structure. The fuel element openings defined by the intersecting grid structural members have dimples extending into them, which coact with a spring depending from the spring strip to position individual ones of the fuel rods within their respective openings within the grid structure. These spring strips are disposed in arrays which extend in varying directions depending upon the particular fuel design in which they are employed and contain spring members which are arranged in such a pattern that the individual spring loads tend to counterbalance each other, i.e., the net load vector from an array of several springs is small or close to zero and therefore the reaction load on supporting structure is minimized resulting in less inreactor distortion while equalizing spring loads. The primary purpose of the zircaloy grid structure is to position the spring strips as opposed to providing a rigid support foundation for them. To facilitate positioning of the strips small tabs extend from the strip at intersections of the grid support strips to facilitate positive positioning within the grid structure. Also, at each of the grid structural strips intersection points there are a pair of intersecting tabs for positioning the spring strip. Due to the flexibility of the spring strips any differential thermal expansion between the Inconel spring strips and the zircaloy grid structure or dimensional inconsistencies due individual part tolerances is taken up by elastic deformation of the spring strip.

In a preferred embodiment, the grid spacer comprises four arrays of spring strips, each of which includes four such strips. The arrays in diagonally opposite quadrants of the spacer extend in the same direction while arrays in adjacent quadrants for each respective half of the spacer are relatively perpendicular. A typical spring strip comprises a plurality of alternately facing longitudinally-spaced vertically disposed springs with adjacent springs being interconnected by top and bottom bridging strips. Each strip pair has essentially V-shaped configuration (when viewed horizontally) with adjacent one disposed in alternately opposite directions. These V-shaped portions receive tabs that extend from the grid supporting strips at the top and bottom of each spring strip for locking the strip in position in the grid structure. At the end of each spring strip there is provided end tabs which are bent so as to provide a positive lock for the spring strips with respect to the grid structural members. Each tab is substantially perpendicular with respect to the length of the strip. The length of each particular strip may vary depending upon the particular fuel bundle design.

In other embodiments, such as for example, an island-type mixed fuel arrangement as disclosed in copending U.S. application Ser. No 573,864, filed May 2, 1975, assigned to the assignee of the present invention, a different type of spring strip arrangement may be employed, although the particular spring strips employed are essentially of th same basic design and construction. The spring strips may vary in certain features such as length or spring pitch, height and number of leaves.

Spring strips, according to the present invention, have utility in almost any grid spacer, typically employed is the standard egg crate type design comprising criss-crossed relatively narrow support strips, e.g., zircaloy-4, which are interlaced and welded together with a peripheral band. The resultant grid provides a support structure of the fuel rods. Each of the grid support strips is slotted at the fuel rod locations to allow the strips thus formed to be bent out to provide an array of dimples that will aid in support of the fuel rods. Inconel spring strips are positioned by the zircaloy structure as discussed heretofore, in appropriate locations so as to cooperate with the dimples to restrain the fuel rods from undesired movement. Thus, each fuel rod is supported at each spacer location by an Inconel leaf spring whose force will be opposed by four rigid zircaloy-4 supports.

The spring strips are located such that they are generally in different locations when the spacer is rotated about its diagonal centerlines. The spacer grids in a particular fuel assembly are disposed so that the springs extending in one direction all would be located in the same sub-channel only at alternating vertical spacer positions, which tends to promote increased mixing between spacers. In the design of each of the spring strips, it is important that the springs have a minimum load which is sufficient to keep the fuel rods seated against the dimples from the beginning of life through the end of the life conditions for each fuel assembly. At the beginning of life the spring force has to overcome any bulging or other tolerance variations in the rod, while at the end of life the radiation and stress relaxations must be taken into consideration. Stresses in the zircaloy cladding relax much more rapidly than those in the Inconel springs and therefore, at end of life conditions the main loadings that the spring spacer strips must restrain are those due to flow induced variations of the fuel rods, (i.e., typically a fraction of the load required at beginning of life). At the same time the spring loads also must be sufficiently low to avoid any overstressing of the cladding.

Having thus described the general nature of the invention and various aspects thereof, reference now will be made to the patent drawings which when taken in conjunction with the following detailed description of the invention will enable those skilled in the art to readily understand the operation, advantages and construction of it.

DESCRIPTION OF THE PREFERRED EMBODIMENTS

Figure 1A:
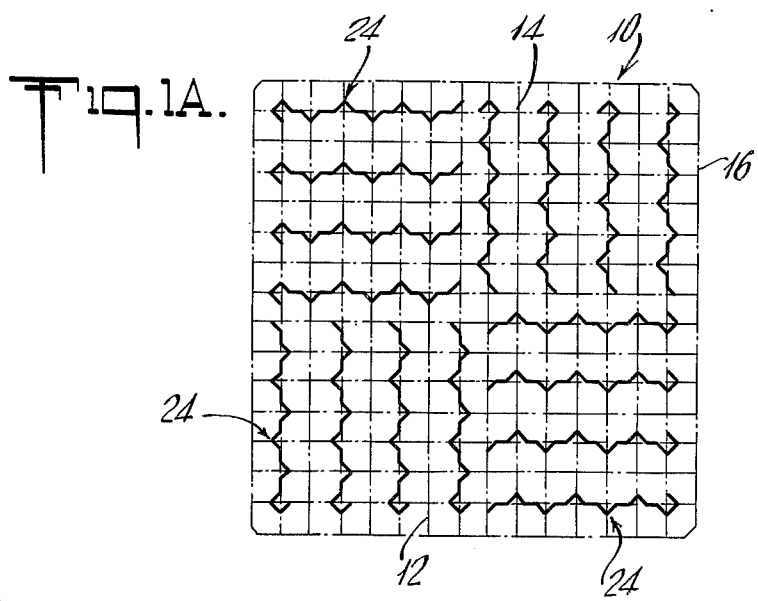
FIG. 1A is a schematic illustration of a grid spacer for a nuclear fuel element assembly wherein the spacer incorporates a spring strip arrangement and construction in accordance with the present invention for a 15 by 15 fuel element array.
Figure 1B:
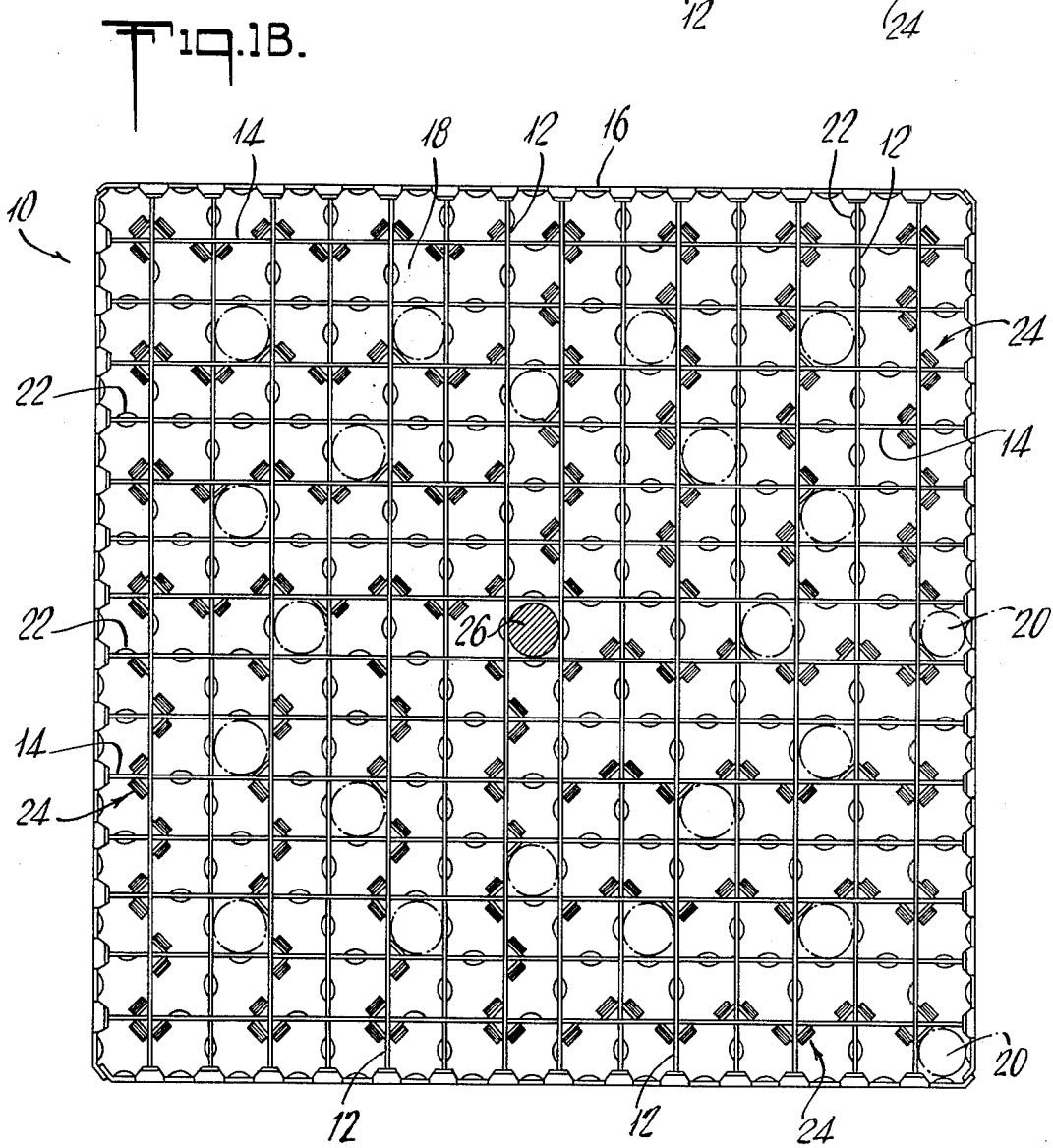
FIG. 1B is a top plan view of the grid spacer schematically shown in FIG. 1A.

Referring now to the drawings wherein like parts are designated by the same reference numeral throughout the several views, there is shown in FIGS. 1A and 1B a grid spacer 10 which essentially comprises a conventional egg crate-type design of criss-crossed narrow zircaloy-4 support strips which comprise the structural lattice strips 12 between the retainer strips 14. These strips are interlaced and welded together at appropriate locations and at their periphery to a peripheral support band 16 which provides overall support structure for the fuel rods. There is thus formed a plurality of openings 18 through which the fuel rods 20 can extend. These grid structural or supporting strips are slotted in a conventional manner at the various fuel rod locations to allow the strip thus formed to be bent out to provide an array of dimples 22 to support the fuel rods disposed in the openings. The spring strips generally designated 24 are made of Inconel and are positioned by the zircaloy grid structure in appropriate locations in order to restrain the fuel rods. The particular location of the various springs is a matter of conventional and known design expediency and per se is not part of the present invention. Essentially, each of the fuel rods will be supported at its spacer location by an Inconel leaf spring whose force will be opposed by four rigid zircaloy-4 dimple supports. As shown in FIG. 1B, the grid includes a standard instrument tube 26 which is illustrated for the sake of showing a substantially complete fuel bundle assembly. Also while fuel rods 20 are shown disposed only in a relatively small number of openings 18, it is well known that the fuel rods will be disposed throughout the fuel bundle, except in those locations which contain the conventional control rod sleeves 25 for maintaining the assembly in its overall assembly relationship.

Each of the spring strips is of a predetermined length and as best shown in FIG. 1A are arranged in a plurality of arrays, each array contains four such strips and is disposed in a quadrant of the grid. In diagonally-opposed quadrants the spring strips extend in the same direction, whereas in adjacent and contiguous quadrants they extend in relatively perpendicular directions.

Figure 2:
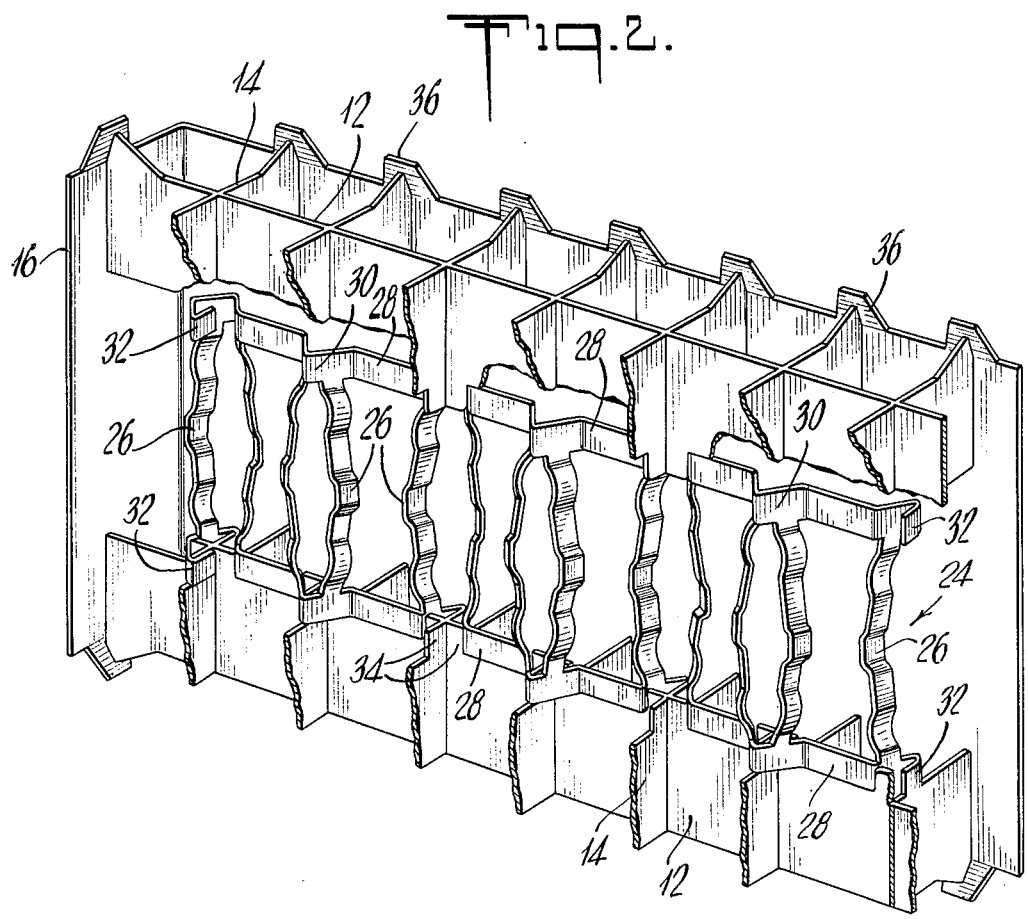
FIG. 2 is a perspective view of a portion of a grid spacer incorporating a spring strip in accordance with the present invention.
Figure 3:
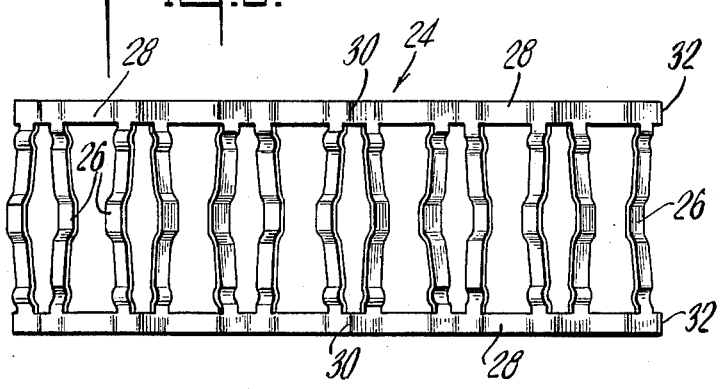
FIG. 3 is a side elevational view of the spring strip shown in FIG. 2.
Figure 5:
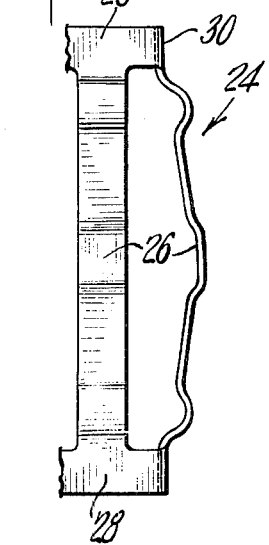
FIG. 5 is a cross-sectional view taken substantially on the line 5—5 of FIG. 4.
Figure 4:
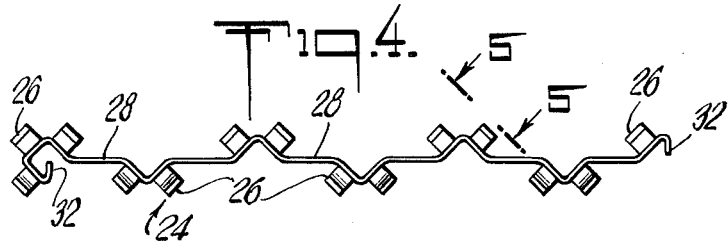
FIG. 4 is a top plan view of the spring strip of FIG. 3.

Turning now to FIG. 2. there is shown a typical spring strip 24 constructed and positioned in the grid structure in accordance with the present invention. The spring strip 24 comprises a plurality of longitudinally-spaced vertical springs 26 which generally are arranged in pairs and are interconnected in horizontal planes at the top and bottom by means of longitudinal bridging strips 28. At the location of each pair of springs they are arranged in a V-shaped configuration designated 30 in both the top and bottom bridging strips. Adjacent pairs of the springs and therefore the V-shaped portions are arranged alternating opposing directions as best shown in FIG. 4. Each of the vertically disposed spring members 26 per se is of a conventional configuration similar to the springs used in conventional lantern-type springs. At the end of each of the spring strips 24 is an end tab 32 which is turned in a direction so as to be in grasping engagement with the grid structure, i.e. the tabs surround the grid tabs so as to positively position the spring strip in place against longitudinal movement. At one end of the spring strip, there is only a single spring member 26 with the end tab 32 forming a V configuration with the plane of the top and bottom portions of the spring.

The end tab is disposed perpendicular to the length of the strip. At the opposite end of the strip a pair of spring members 26 are provided and are formed in essentially a V-shaped configuration with the end tab 32 also being substantially perpendicular to the longitudinal direction length of the spring strip. This can best be seen by reference to FIG. 4. The top and bottom longitudinal bridging strips 28 and each comprise flat interconnecting sections which interconnect the V-shaped capture portions 30 of the strip which face in opposing directions.

The grid spacer shown in FIG. 2 includes downwardly and upwardly extended tab members 34 from the support strips 12 and 14 which are captured internally of each capture portion 30 of each strip. As shown the end tabs 32 surround one of the extended tabs in contiguous and parallel relationship, thus preventing shift of the strip in a longitudinal direction. The grid spacer also may be provided with the vanes 36 which do not form part of the present invention as disclosed in copending U.S. application Ser. No. 554,000, filed Feb. 28, 1975, assigned to the assignee of the present invention, to which reference may be made for further details in regard to such vanes.

Figure 6A:
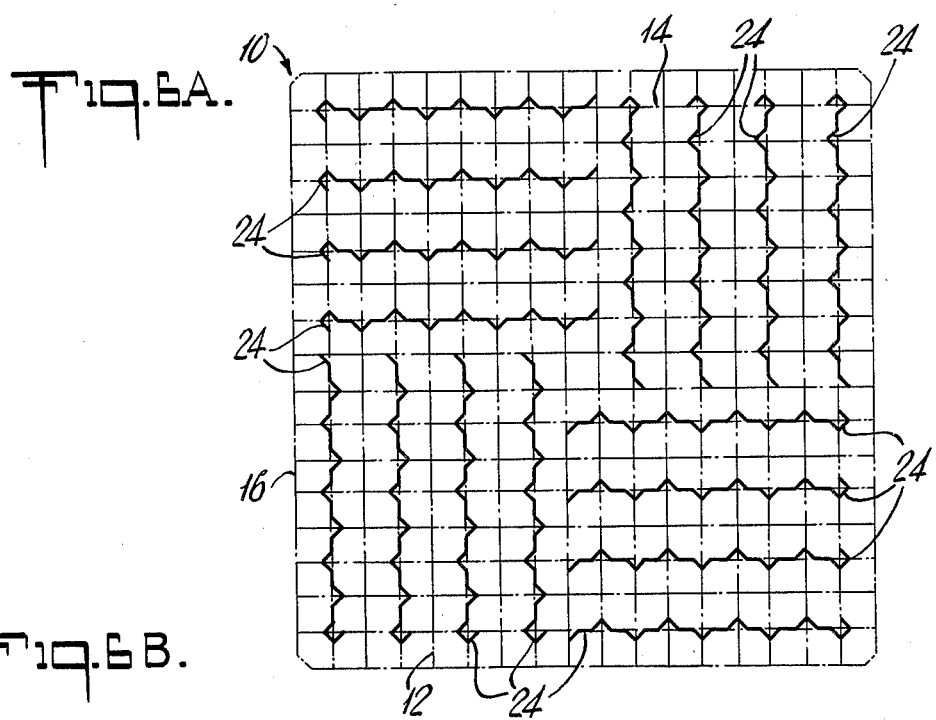
FIG. 6A is a schematic illustration of a grid spacer incorporating a spring strip arrangement and construction in accordance with the present invention for a 17 by 17 fuel design.
Figure 6B:
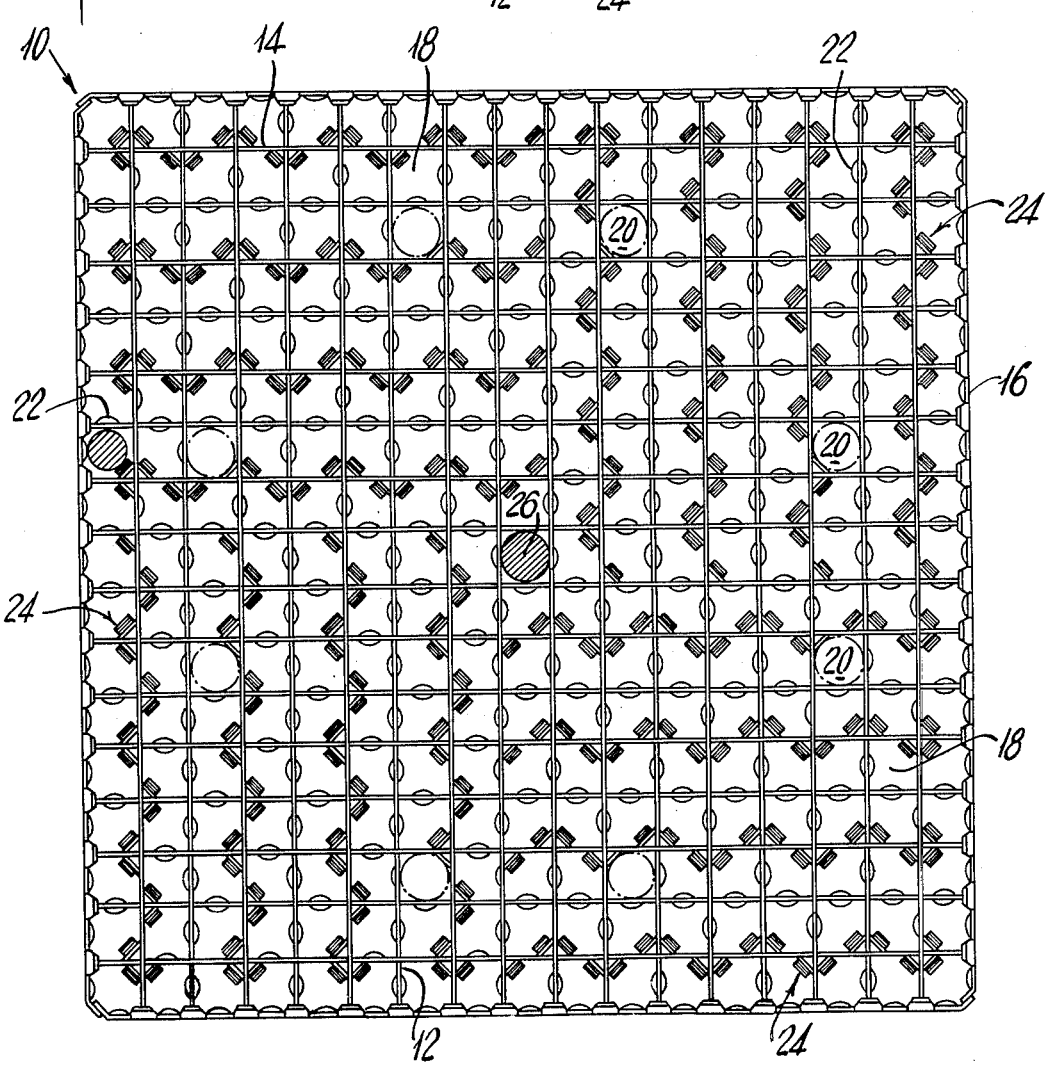
FIG. 6B is a top plan view of the grid spacer schematically shown in FIG. 6A.
Figure 7A:
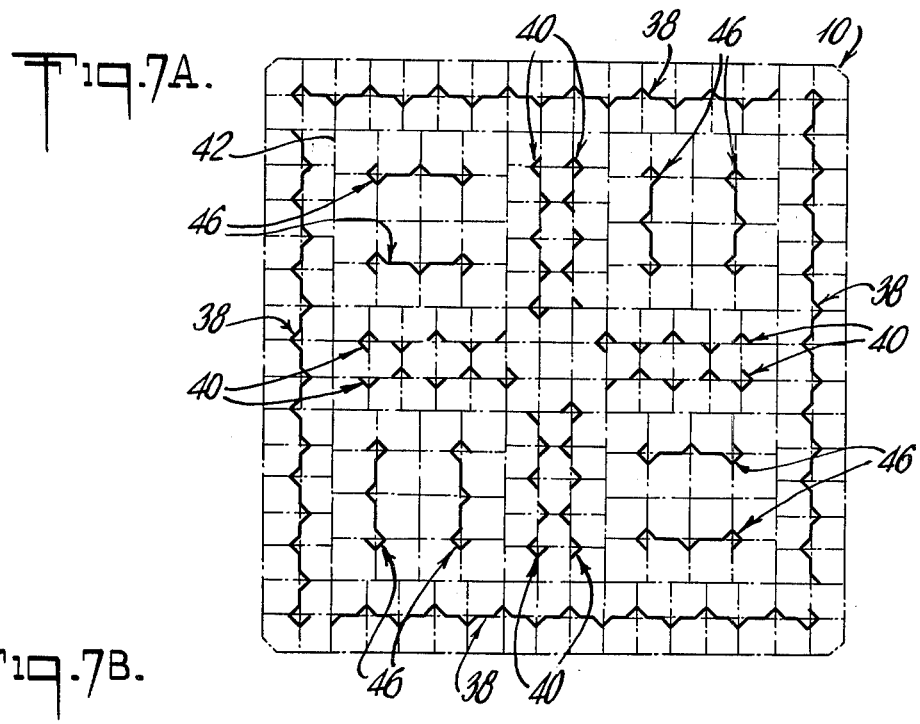
FIG. 7A is a schematic illustration of a grid spacer incorporating a spring strip construction and arrangement in accordance with the present invention for a mixed fuel design.
Figure 7B:
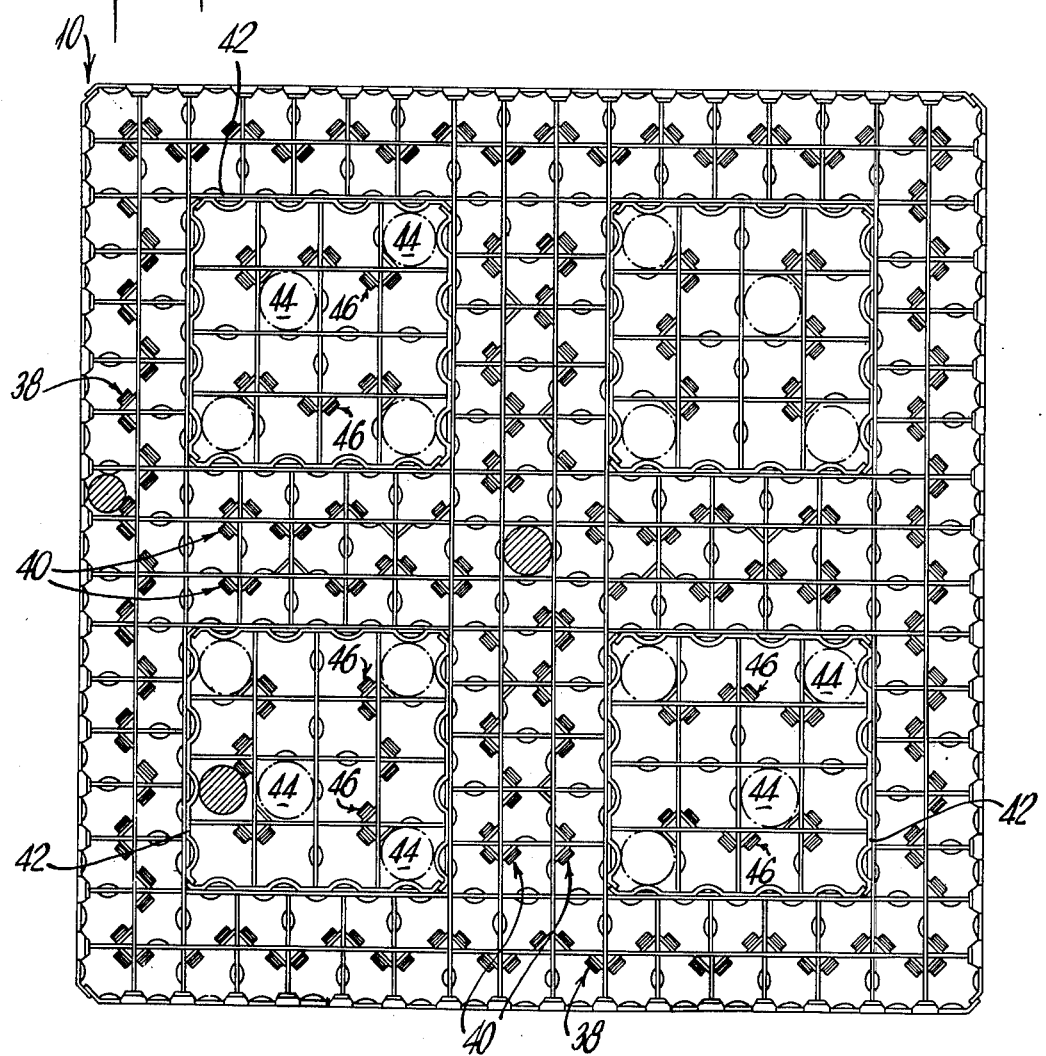
FIG. 7B is a top plan view of the grid spacer schematically shown in FIG. 7A.

FIGS. 6A and 6B are essentially the same as the embodiment of FIGS. 1A and 1B, except they illustrate a 17 × 17 fuel bundle design. The construction and arrangement of the spring strips are the same with minor modifications to the length of the strip (because of the larger size fuel bundle) employed. The primary difference is in the disposition of the spring strips, their length and orientation within the grid structure and with reference to one another, all of which depends upon the fuel bundle assembly design in which the fuel elements require support by spring members. Reference may be made to the aforesaid copending U.S. patent application Ser. No. 573,864, for a detailed description of the overall design of a fuel bundle assembly as illustrated in FIGS. 7A and 7B. However, it suffices for the present invention to provide a general description thereof with emphasis being placed on the inventive aspects of the present invention which relate to the spring strip construction and arrangement. In FIG. 7A, a single spring strip 38 (essentially the same as the strip 24) is located at the periphery of the grid and for substantially the total length of each side of the grid spacer. Pairs of spring strips 40 which are substantially shorter in length than the strips 38 but otherwise have the same general configuration and construction are located adjacent and on opposite sides of the centerline of the grid spacer. Within each of the islands 42 which include the guide tubes 44 are provided another pair of spring strips 46 constructed and arranged according to the present invention. These strips are essentially arranged as mirror images.

While there has been shown a preferred embodiment and various modifications of the present invention, further modifications which are within the scope of this invention will become apparent to those skilled in the art. For example, while certain fuel designs have been disclosed the invention also has utility in other designs which require spring supports for the fuel rods. Accordingly, in order to determine the true scope of the invention, reference should be made to the appended claims.

What is claimed is:

1. A grid spacer for use in a nuclear fuel element assembly for maintaining the fuel rods in relatively spaced and substantially parallel relation, comprising a plurality of intersecting support strips and a peripheral support band secured to the ends of said support strips, a first plurality of said support strips defining an upper grid and a second plurality of said support strips defining a lower grid spaced from said upper grid wherein the intersecting strips form a plurality of openings for receiving fuel rods therein, each of said fuel rod receiving openings having a plurality of dimples protruding from said support strips into said openings and a plurality of spring means extending in different directions between the sides of said grid spacer and coacting with said dimples to maintain said fuel rods in position in said openings, each of said spring means comprising a longitudinally extended spring strip having an upper bridging member and a lower bridging member and spring members transversely disposed said members connected between said upper and lower bridging members, at spaced locations along the length of said strip, said spring members at adjacent locations extending in alternating opposite transverse directions with respect to said bridging members and having corresponding transversely extending capture portions at each of the locations of said spring members, and means associated with said grids for internally engaging said capture portions for positioning said spring means between said upper and lower grids of said grid spacer.

2. The grid spacer of claim 1 wherein each of said spring strips includes an end tab at opposite longitudinal ends thereof in engagement with said grid spacer for positively locking said spring strips in place.

3. The grid spacer of claim 1 wherein said bridging members include flat portions interconnecting said capture portions.

4. The grid spacer of claim 3 wherein said capture portions have a V-shaped configuration.

5. The grid spacer of claim 2 wherein said end tabs extend perpendicular to the direction of said bridging members.

6. The grid spacer of claim 1 wherein said spring strip comprises a spring material and said grid structure comprises a material having low neutron absorption characteristics.

7. The grid spacer of claim 1 wherein said spring strip comprises Inconel and said grid structure comprises zircaloy.

8. The spring strip of claim 1 wherein said capture portions are disposed in spaced horizontal planes including said upper and lower bridging members.

9. A spring strip for use in a grid spacer for a nuclear fuel element assembly, comprising a longitudinally extended strip having continuous upper and lower horizontal bridging members, a plurality of resilient vertical members integrally formed with said upper and lower bridging members at spaced locations along the length of said strip, a pair of said resilient members being at a plurality of said locations and said resilient members at adjacent ones of said locations extending in transversely opposite directions with respect to said strip and said bridging members comprising a substantially V-shaped configuration in a horizontal plane at each of said locations which faces in the same direction as said resilient members, and end tabs situated at opposite ends of said bridging members of said strip, disposed in perpendicular relation with respect to the general longitudinal direction of said strip.

10. A grid spacer for use in a nuclear fuel element assembly for maintaining the fuel rods in relatively spaced and substantially parallel relation, comprising a plurality of intersecting support strips and a peripheral support band secured to the ends of said support strips, a first plurality of said support strips defining an upper grid and a second plurality of said support strips defining a lower grid spaced from said upper grid wherein the intersecting strips form a plurality of openings for receiving fuel rods therein, each of said fuel rod receiving openings having a plurality of dimples protruding from said support strips into said openings and a plurality of spring means extending in different directions between the sides of said grid spacer and coacting with said dimples to maintain said fuel rods in position in said openings, each of said spring means comprising a longitudinally extended spring strip having an upper bridging member and a lower bridging member and spring members transversely disposed said members connected between said upper and lower bridging members, at spaced locations along the length of said strip, said spring members at adjacent locations extending in alternating opposite directions with respect to said bridging members and having V-shaped capture portions at each of the locations of said spring members, and means associated with said grids deposited in internal engagement with said capture portions for positioning said spring means in said grid spacer.

* * * * *